United States Patent [19]

Nomura

[11] 4,294,325
[45] Oct. 13, 1981

[54] POWER ASSISTED STEERING SYSTEM FOR VEHICLES

[75] Inventor: Yoshihiko Nomura, Nagoya, Japan

[73] Assignee: Aisin Seiki Kabushiki Kaisha, Kariya, Japan

[21] Appl. No.: 45,887

[22] Filed: Jun. 6, 1979

[30] Foreign Application Priority Data

Jun. 12, 1978 [JP] Japan .................. 53-80291[U]

[51] Int. Cl.³ ............................................... B62D 5/08
[52] U.S. Cl. .................................. 180/148; 91/375 A
[58] Field of Search ...................... 180/148, 146, 147; 91/375 A

[56] References Cited

FOREIGN PATENT DOCUMENTS 2434604  6/1975 Fed. Rep. of Germany ... 91/375 A
1305375  8/1962 France ............................... 180/148
945318  12/1963 United Kingdom ............... 180/146

*Primary Examiner*—John A. Pekar
*Attorney, Agent, or Firm*—Sughrue, Mion, Zinn, Macpeak and Seas

[57] ABSTRACT

A power assisted steering system for vehicles comprises a control valve for controlling the actuation of a hydraulic servomotor operatively connected to a steering link mechanism, a valve body connected for rotation with a pinion engaged with a rack which is operatively connected to the steering link mechanism, valve members operable within the valve body and connected to a steering shaft and a torsion bar connected to the valve body and the steering shaft at opposite ends thereof. The valve body and the pinion are formed as separate elements while the torsion bar and the pinion are formed integral with each other in one piece.

2 Claims, 3 Drawing Figures

POWER ASSISTED STEERING SYSTEM FOR VEHICLES

BACKGROUND OF THE INVENTION

1. Field of the Invention

The present invention relates generally to the field of power assisted steering systems for automotive vehicles and more particularly to such a system employing a torque responsive control mechanism for controlling the operation of a servomotor.

2. Description of the Prior Art

In known power assisted steering systems a valve body is generally formed integrally with the pinion of the system and the torsion bar is formed as a separate element from the valve body and pinion. One end of the torsion bar is generally connected to the valve body by means of a pin and the other end of the torsion bar is connected to the steering shaft. In this type of construction, a substantial gap must be provided between the pinion and the valve body so as to prevent the valve body from being damaged by the cutter during the formation of the pinion teeth. As a result, the control valve and piston member have an excessive overall axial length. In addition, any heat treatment provided in order to improve the characteristics of the pinion should be isolated from the valve body thereby necessitating greater axial length of the combined valve body and pinion.

SUMMARY OF THE INVENTION

The present invention provides a new and improved power assisted steering system for vehicles which obviates the above-mentioned drawback of excessive axial length.

The present invention provides a new and improved power assisted steering system for vehicles wherein the valve body is made as a separate element from the pinion and the torsion bar is constructed as an integral one-piece member with the pinion.

The present invention provides a new and improved power assisted steering system for vehicles which has a shorter axial length than the above-mentioned prior art system and is therefore considerably lighter in weight.

The foregoing and other objects, features and advantages of the invention will be apparent from the following more particular description of a preferred embodiment of the invention as illustrated in the accompanying drawings.

DETAILED DESCRIPTION OF A PREFERRED EMBODIMENT

Figure 1:
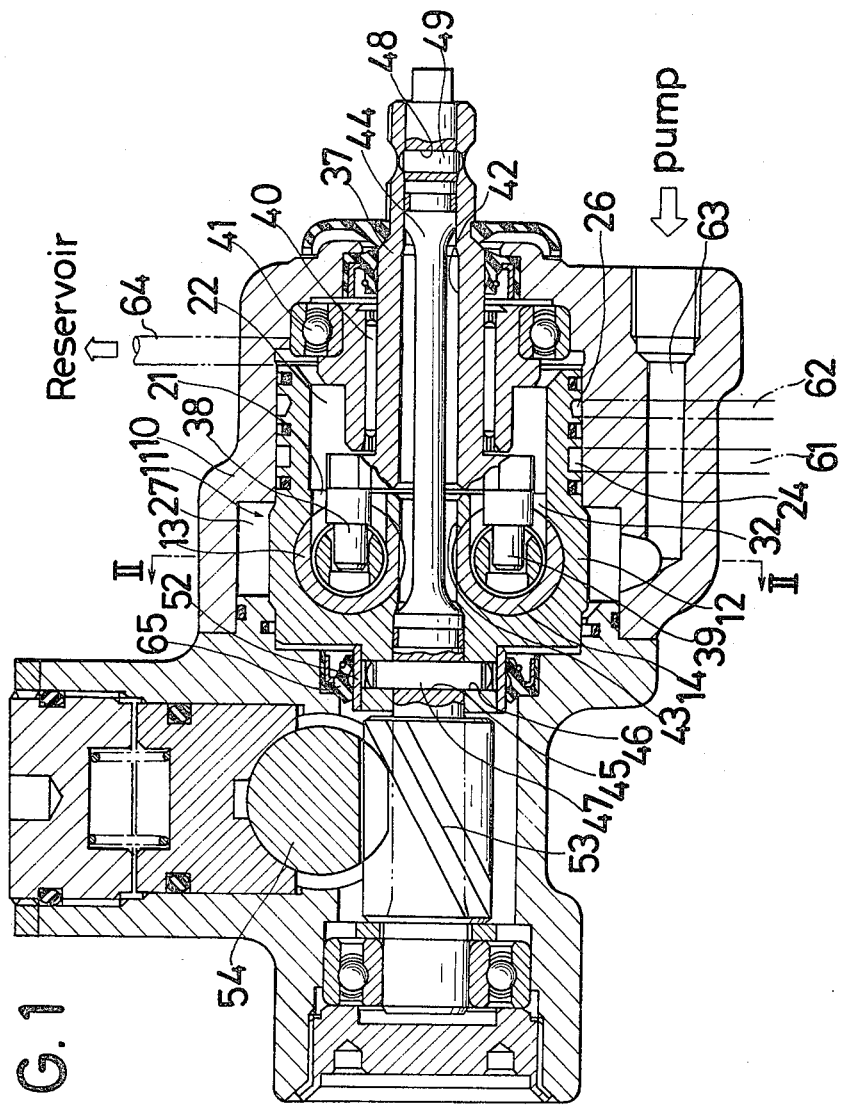
FIG. 1 is a sectional view of a power assisted steering system embodying the principles of the present invention.
Figure 2:
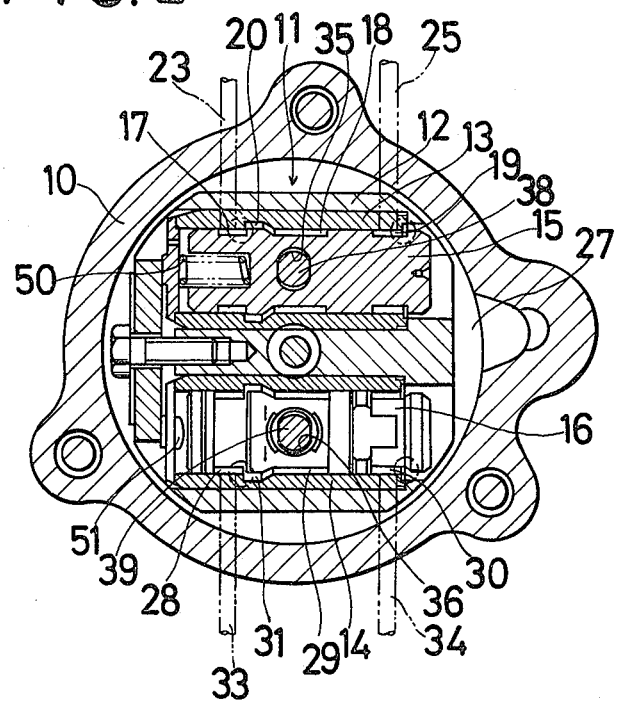
FIG. 2 is a cross-sectional view of the system taken substantially along the line II—II in FIG. 1.

Referring to FIGS. 1 and 2, a control valve 11 is disposed within a housing 10 which is fixed to a vehicle body (not shown). The control valve 11 is comprised of a valve body 12 the outer circumference of which is rotatably supported by the housing 10. The valve body 12 is provided with a central bore and two transversely extending bores which are symmetrically disposed relative to the axis of the central bore. Sleeves 13 and 14 are disposed within the transverse bores in the valve body 12 and valves 15 and 16 are slidably disposed within sleeves 13 and 14, respectively.

The valve 15 is provided with four lands and three annular passages 17, 18 and 19 on the outer circumference thereof so as to be disposed between the valve 15 and the sleeve 13. The annular passage 18 which is centrally located is always in fluid communication with an annular groove 20 located in the inner circumference of the sleeve 13 and is always disposed in fluid communication with chamber 22 by means of a passage 21 which is formed through the sleeve 13 and the valve body 12. The chamber 22 is defined within the housing 10 by the valve body 12 as shown in FIG. 1. The annular passage 17 is always in fluid communication with an annular groove 24 formed on the outer circumference of the valve body 12 by means of a passage 23 which is mounted in the sleeve 13 and the valve body 12. The annular passage 19 is always disposed in fluid communication with an annular groove 26 formed on the outer circumference of the valve body 12 by means of a passage 25 which is mounted in the sleeve 13 and valve body 12. When the valve 15 is located in the neutral position as shown in FIG. 2, the annular passage 17 is disposed in fluid communication with the annular passage 20 and the annular passage 19 is disposed in fluid communication with a chamber 27 defined within the housing 10 by the valve body 12.

The valve 16 is provided with four lands and three annular passages 28, 29 and 30 on the outer circumference thereof so that they are located between the valve 16 and the sleeve 14. The annular passage 29 which is centrally located is always disposed in fluid communication with an annular groove 31 in the inner circumference of the sleeve 14 which in turn is disposed in fluid communication with the chamber 22 by means of a passage 32 which is formed in the sleeve 14 and the valve body 12.

The annular passage 30 is always disposed in fluid communication with the annular groove 24 formed on the outer circumference of the valve body 12 by means of passage 34 which is in the sleeve 13 and the valve body 12. When the valve 16 is located in the neutral position as shown in FIG. 2, the annular passages 28 and 30 are disposed in fluid communication with the annular groove 31 and the chamber 27, respectively. Thus, when the valves 15 and 16 are both located in the neutral position, there will not be any buildup of pressure in the hydraulic chambers 59 and 60 of the servomotor 55.

Pins 38 and 39 are mounted on an end portion of a steering shaft 37 and extend into holes 35 and 36 of valves 15 and 16, respectively. The steering shaft 37 is rotatably supported in the housing 10 by bearings 40 and 41 and is operatively connected to a steering wheel (not shown) so as to rotate therewith. A torsion rod 44 is disposed within an axial bore 42 in the steering shaft 37 and an axial bore 43 in the valve body 12. The torsion rod 44 is connected to the valve body 12 by means of a pin 47 secured in a hole 45 formed on one end of the torsion rod 44 and a hole 46 formed in the boss portion of the valve body 12. The torsion rod 44 is secured to the steering shaft 37 by means of a pin 49 disposed in a hole 48 at the opposite end of the torsion rod 44. The torsion rod 44 which is interposed between the sleeves 13 and 14 keeps the valves 15 and 16 in the neutral position in corporation with springs 50 and 51 which urge the valves 15 and 16 to the right as viewed in FIG. 2. A ring 52 is secured on the outer circumference of the boss portion of the valve body 12.

As best seen in FIG. 1, the valve body 12 and the torsion rod 44 are formed separately from each other and the torsion rod 44 and the pinion 53 are formed integrally with each other as a single piece. The pinion 15 is engaged with a rack 54 connected to a steering link mechanism (not shown) so that the valve body 12 will be rotated within the housing 10 in accordance with the steering angle.

Figure 3:
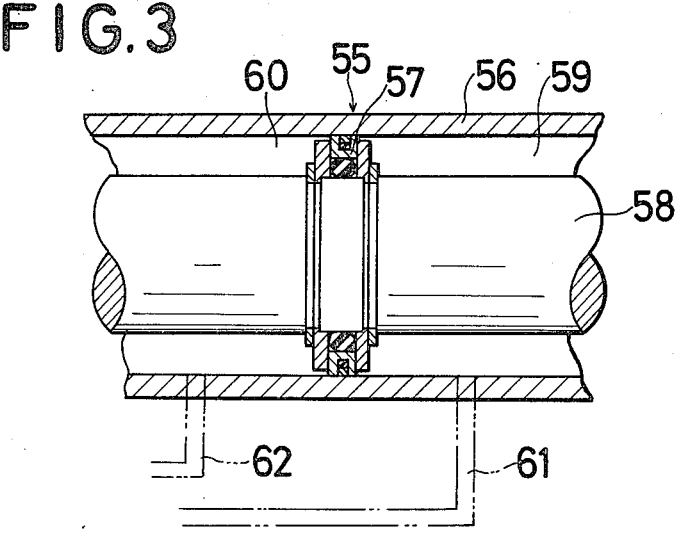
FIG. 3 is a partial sectional view of the hydraulic servomotor.

In FIG. 3, a hydraulic servomotor 55 is shown which is operatively connected to the steering link mechanism. A cylinder 56 is mounted in a stationary manner and a piston 57 which is secured to a shaft portion 58 of the rack 54 is slidable therein. Hydraulic chambers 59 and 60 are located on opposite sides of the piston 57 and are disposed in fluid communication with the annular grooves 24 and 26 by means of passages 61 and 62 as shown in FIGS. 1 and 3.

In FIG. 1, the chamber 27 is disposed in fluid communication with a hydraulic pump (not shown) by means of a passage 63 formed in the housing 10 and the chamber 22 is disposed in fluid communication with a reservoir (not shown) by means of a passage 64 formed in the housing 10. Seals such as seal 55 are disposed in opposite ends of the valve assembly in addition to various O-rings associated with component parts. Upon rotation of the steering shaft 37 by means of the steering wheel, for instance in the clockwise direction, the valve 15 will be moved to the right while the valve 16 will be moved to the left as viewed in FIG. 2. Therefore, the fluid pressure from the pump will be delivered to the chamber 60 of the servomotor by way of passage 63, chamber 27 and passages 19, 25, 26 and 62. Simultaneously, the hydraulic chamber 59 of the servomotor will be connected to the reservoir by passages 61, 24, 23, 17, 20 and 21, chamber 22 and passage 64. As a result, the piston 57 and the shaft 58 to which it is secured will be moved to the right as viewed in FIG. 3 to assist the movement of the rack. Upon turning the steering wheel in the opposite direction, the hydraulic chamber 59 will be pressurized and the chamber 60 connected to the reservoir in a similar manner.

According to the invention the valve body 12 may be connected to the torsion bar 44 after the formation of the pinion 53. Thus, the valve body 12 will not interfere with the operation of a cutter for forming the teeth on the pinion 53 and the overall axial length of the assembly may be substantially shortened.

Obviously, many modifications and variations of the present invention are possible in light of the above teachings. It is, therefore, to be understood that within the scope of the appended claims, the invention may be practiced otherwise than as specifically described herein.

What is claimed is:

1. A power assisted steering system for vehicles comprising a steering shaft adapted to be rotated by a steering wheel, rack means adapted to be connected to steering link means, pinion means engaged with said rack means, a torsion rod operatively connected to said pinion means and said steering shaft means at opposite ends thereof, said torsion rod and said pinion means being of integral one-piece construction with the diameter of said rod being substantially smaller than that of said pinion means, a valve body separate from said pinion means, means connecting said valve body to the end of said torsion rod operatively connected to said pinion means, hydraulic servomotor means operatively connected to said rack means and control valve means operatively connected to said steering shaft means and associated with said valve body for controlling the actuation of said hydraulic servomotor in accordance with the rotation of said steering shaft means.

2. A power assisted steering system for vehicles as set forth in claim 1, wherein said means for connecting said valve body to said torsion rod is comprised of a pin extending through aligned holes in said valve body and said torsion rod.

* * * * *